United States Patent [19]
Deroux-Dauphin

[11] Patent Number: 5,062,196
[45] Date of Patent: Nov. 5, 1991

[54] METHOD OF MANUFACTURING THE POLE PIECES AND THE GAP OF MAGNETIC HEADS IN THIN LAYERS

[75] Inventor: Patrice Deroux-Dauphin, Saint Egreve, France

[73] Assignee: Compagnie Europeenne de Composants Electroniques LCC, Courbevoie, France

[21] Appl. No.: 572,553

[22] Filed: Aug. 27, 1990

[30] Foreign Application Priority Data

Sep. 12, 1989 [FR] France ................ 89 11892

[51] Int. Cl.⁵ .............................. G11B 5/42
[52] U.S. Cl. ...................... 29/603; 427/116; 427/131
[58] Field of Search ............ 29/603; 360/119-121, 360/125, 127; 427/116, 131

[56] References Cited

U.S. PATENT DOCUMENTS 4,837,924 6/1989 Lazzari ................... 29/603

FOREIGN PATENT DOCUMENTS 140524 5/1985 European Pat. Off. .

OTHER PUBLICATIONS

Patent Abstracts of Japan, vol. 7, No. 164 (P-211) (1309), Jul. 19, 1983, & JP-A-58 070416 (Matsushita Denki Sangyo K. K.), Apr. 26, 1983.

Romankow et al., "Batch Fabrication of Keyhole Type Magnetic Recording Heads," IBM Technical Disclosure Bulletin, vol. 17, No. 11, Apr., 1975, pp. 3446-3449.

Primary Examiner—Carl E. Hall
Attorney, Agent, or Firm—Pollock, VandeSande & Priddy

[57] ABSTRACT

A method of manufacturing the pole pieces and the gap of magnetic heads in thin layers for computer, audio and video applications, starting from a silicon substrate, includes formation of an insulator layer on a silicon substrate followed by deposition of a metal layer on the insulator layer and of a masking resin layer on the metal layer. The substrate covered with the insulator layer and the metal layer is etched to form wells bordering a bar of a determined width and the left-over portion of the metal layer etched is removed. The etched substrate is thermally oxidized to develop a silicon oxide layer enabling the bar to be adjusted to obtain the desired gap. A conductive layer is deposited at the bottom of the wells followed by the electrolytic deposition of a magnetic material in the wells and the removal of the left-over portion of the insulator layer initially deposited on the substrate.

2 Claims, 5 Drawing Sheets

FIG_1
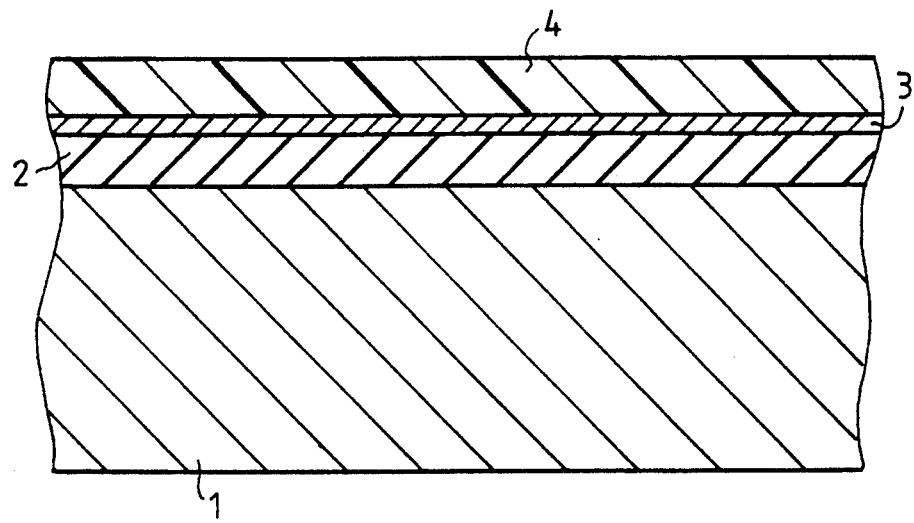
FIG_2
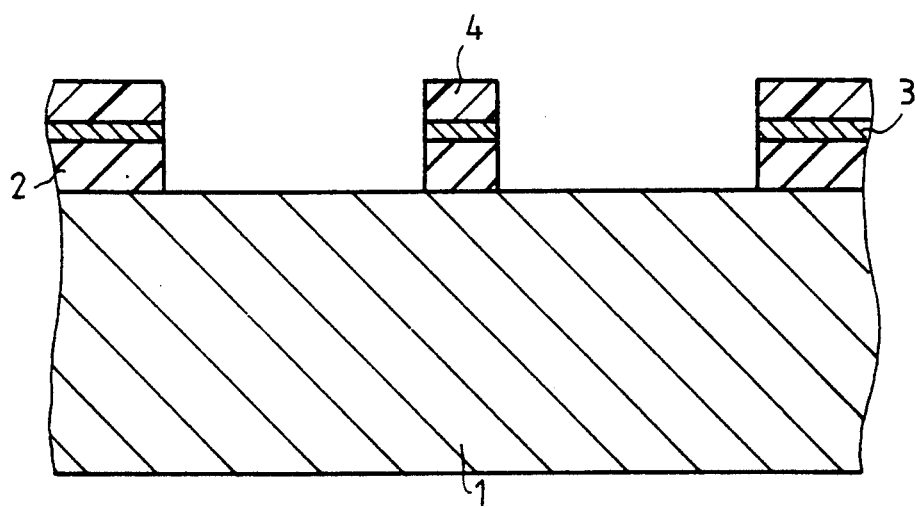

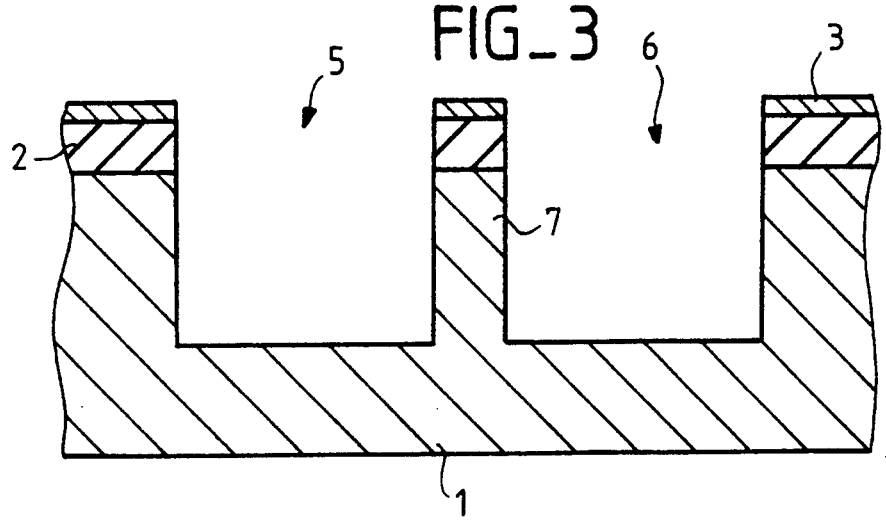
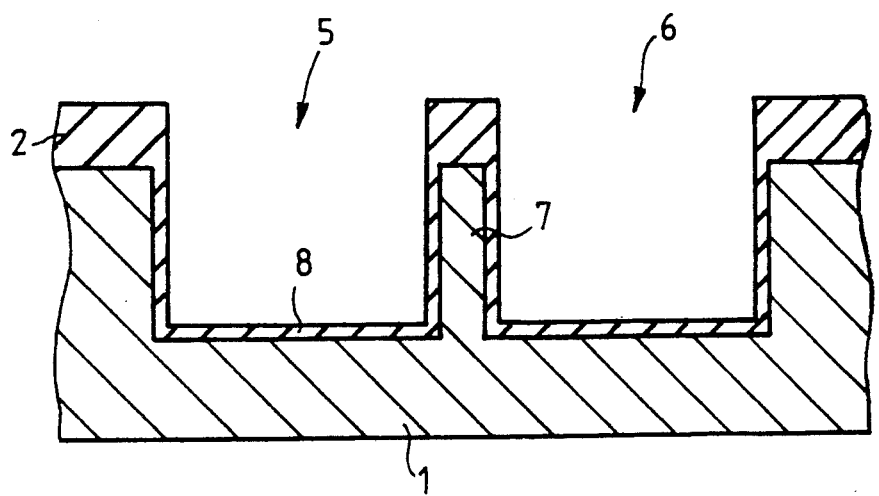

FIG_5
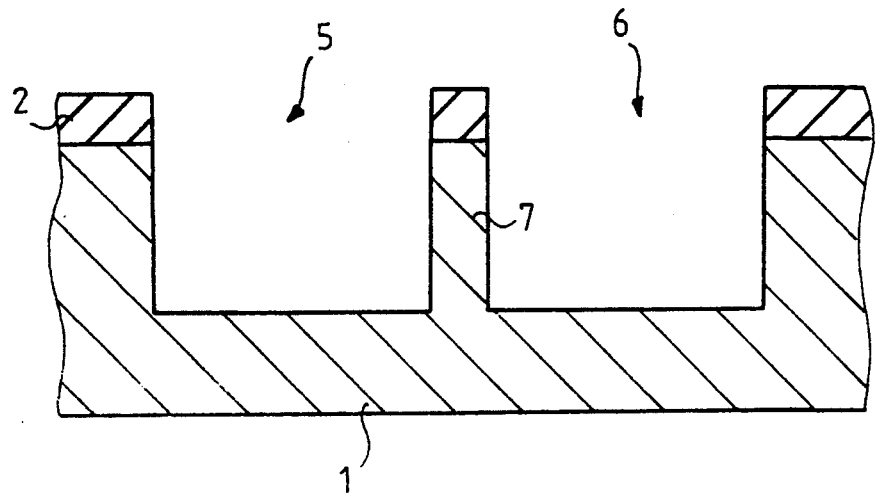
FIG_6
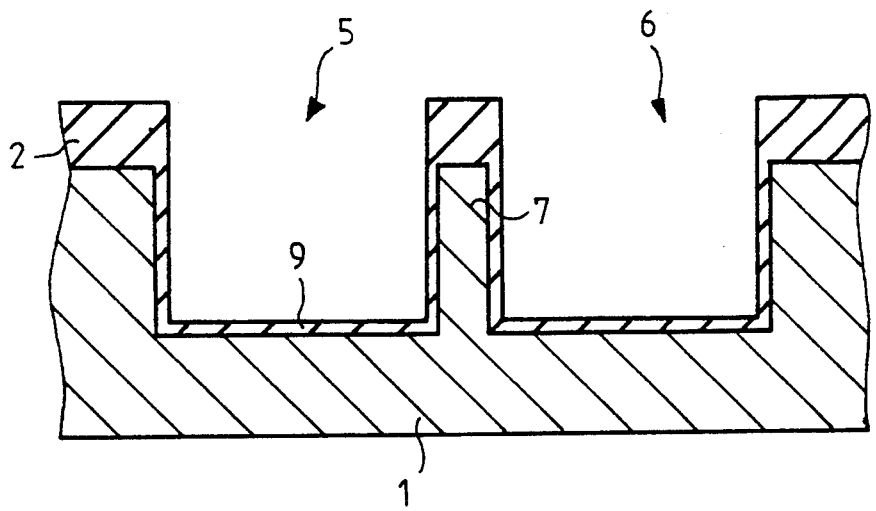

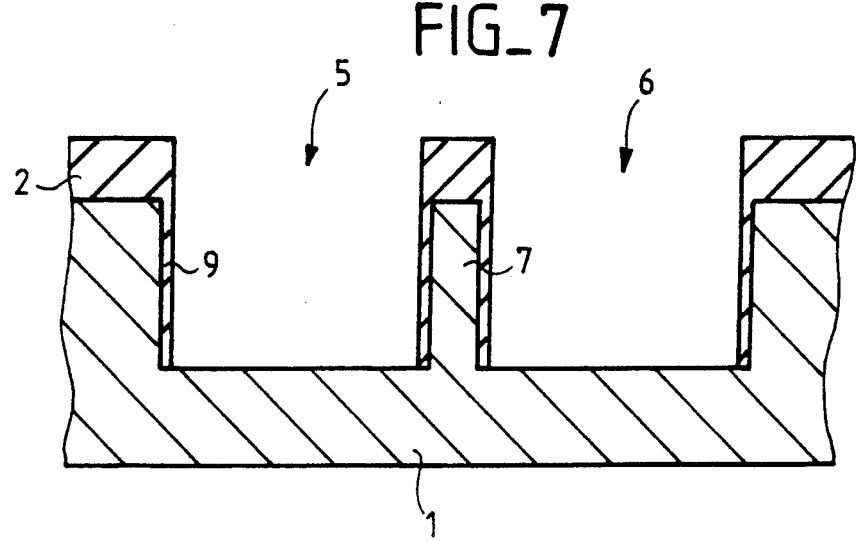
FIG_7
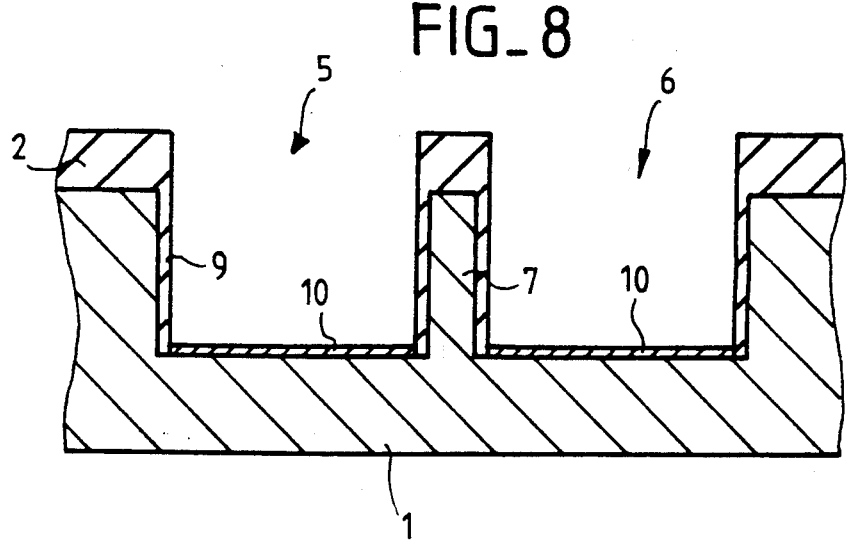
FIG_8
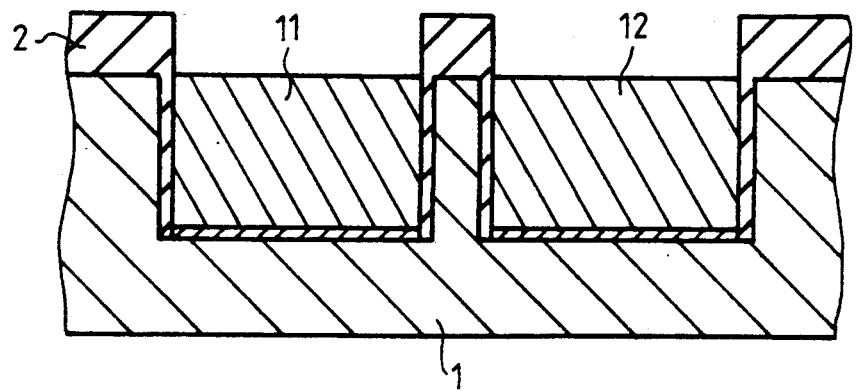
FIG_9

FIG_10
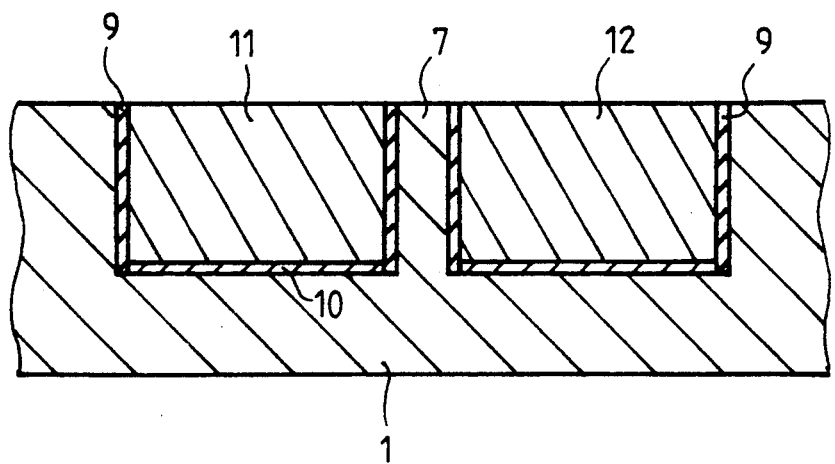

METHOD OF MANUFACTURING THE POLE PIECES AND THE GAP OF MAGNETIC HEADS IN THIN LAYERS

BACKGROUND OF THE INVENTION

1. Field of the Invention

The present invention is directed to a method for the making of magnetic heads in thin layers and with a planar structure. In particular, it concerns the making of the pole pieces and the gap of recording and reading heads for different applications such as computer, audio or video applications.

2. Description of the Prior Art

Depending on the types of heads, the applications and the desired performance characteristics, different technologies may be used to make the gap and the pole pieces. The patent application EP 262 028 discloses a method for making magnetic heads in thin layers and with a planar structure. This method makes it possible to obtain a narrow gap formed by a non-magnetic layer and pole pieces with a shape such that they lead to a concentration of flux in the vicinity of the gap and have a small area without protection. This method implements thin layer deposition and etching operations that are usual in the technology of integrated circuits, as well as operations for the electrolytic deposition of various magnetic layers.

However the method according to the EP 262 028 provides for the making of magnetic heads that have the following drawbacks.

The height of the pole pieces is restricted to a maximum value of about 4 to 5 $\mu$m. This method therefore cannot be used for making DAT (digital audio tape) or video heads which are subjected, during operation, to a major degree of wear and tear, and therefore require the pole pieces with a greater height (of the order of 15 $pm$).

Furthermore, the gap (or spacer) is relatively brittle. Although, the gap is mounted on a support and is of the same nature as the support, there is nevertheless a point of embrittlement at the interface between the gap and the support.

Also it is difficult to achieve perfect control over the perpendicularity of the spacer for major heights (4 to 5 $\mu$m).

The fact that the gap is obtained by the deposition of a mineral material and by a method appropriate for this material results in the thickness of the gap being restricted to values ranging from 0.3 $\mu$m to 2 $\mu$m.

SUMMARY OF THE INVENTION

To overcome these drawbacks, the present invention proposes a method that makes it possible, through the use of the techniques of microelectronics, to make gaps with a thickness within the range between about 0.1 $\mu$m and about ten $\mu$m, and to achieve heights of pole pieces within the range between about 0.1 $\mu$m and about fifteen $\mu$m, with excellent control of the thickness and height of the spacer and excellent mechanical rigidity for this spacer. This remarkable mechanical strength arises out of the fact that, in the case of the invention, the spacer is made in the mass and not mounted as in the patent application EP 262 028.

An object of the present invention therefore is to provide a method for making the pole pieces and the gap of magnetic heads in thin layers and with a planar structure, starting from a silicon substrate and including the following steps:

a) the formation of an insulator layer on a silicon substrate;

b) the deposition of a metal layer on the insulator layer;

c) the deposition of a masking resin layer on the metal layer;

d) the etching of the substrate covered with the insulator layer and the metal layer to form wells bordering a bar of a determined width;

e) the removal of the left-over portion of the metal layer etched in the previous step;

f) the thermal oxidation of the etched substrate to develop a silicon oxide layer enabling said bar to be adjusted to obtain the desired gap;

g) the selective etching of the oxide layer developed in the previous stage in order to remove the parts of this layer that are located at the bottom of the wells;

h) the deposition of a conductive layer at the bottom of the wells;

i) the electrolytic deposition of a magnetic material in the wells;

j) the removal of the left-over portion of the insulator layer deposited initially on the substrate.

BRIEF DESCRIPTION OF THE DRAWINGS

The invention will be understood more clearly, and other advantages will appear from the following description, given as a non-restrictive example, and by means of FIGS. 1 to 10 which illustrate the different manufacturing steps of the method according to the present invention.

DETAILED DESCRIPTION OF THE INVENTION

According to the invention, the pole pieces and the gap are made out of a silicon substrate which will be processed preferably so as to provide for the formation of a large number of magnetic heads from the same substrate. The substrate may be processed so that it is already provided with electrical coils. In the alternative it may be unprocessed, in which case the pole pieces and the gap will be mounted on a magnetic closing circuit provided with one or two coils.

FIG. 1 shows a silicon substrate 1, on which an insulator layer 2 is deposited. This insulator layer may be formed by thermal oxidation of the silicon substrate. It may also have been deposited by chemical means (by CVD). This method is well suited to the deposition of silicon oxide or silicon nitride. The insulator layer 2 may have a thickness ranging from about 0.5 to 5 $\mu$m.

A metal layer 3 is deposited on the insulator layer 2. It may be a layer of tungsten deposited by cathode sputtering and having a thickness ranging from about 0.5 to 3 $\mu$m.

A masking resin layer 4 is deposited on the metal layer 3.

The function of the resin layer 4, after masking and insulation, is to define the pole pieces and the gap. FIG. 2 shows the substrate 1 where the metal layer 3 and the insulator layer 2 have been etched. FIG. 3 shows the substrate 1 at the end of the etching operation. Two wells 5 and 6 have been made, defining a bar 7 out of which the gap will be made. The main purpose of the metal mask formed by the etched metal layer 3 is to obtain an anisotropic etching of the insulator layer then an anisotropic etching of the substrate 1. The etching is done by techniques known to those skilled in the art. For example it is done in a plasma etching reactor.

After these operations, the left-over portion of the metal mask is removed by chemical etching.

The thickness of the bar 7 is predetermined, as are the dimensions of the wells 5 and 6 that border it. This thickness may be satisfactory for the planned gap. In certain cases, however, particularly when it is desired to have very small gap thicknesses, it may become necessary to provide for the following two additional steps.

A first step, illustrated by FIG. 4, consists in causing the formation, by thermal oxidation, of a surface layer 8 of silicon oxide. The thickness of the silicon oxide surface layer is determined as a function of the desired gap thickness. This method has the advantage of precision since the thermal oxide growth can be very well controlled. For example, if a final gap with a thickness of 0.4 μm is desired, the starting thickness of the bar 7 may be 1.2 μm (this is easy to achieve by lithography), and the thickness of the silicon oxide surface layer 8 may be 0.4 μm. Thus, when silicon oxide surface layer 8 is removed during the second step, a gap with the desired width, i.e. 0.4 μm, is obtained. FIG. 5 illustrates this stage of the method.

Then, a thermal oxidation is performed with a two-fold aim: defining the exact thickness of the final gap and creating another lateral insulation. Thus, a silicon oxide surface layer 9 is developed on the etched substrate, as shown in FIG. 6.

Then, a selective etching of the silicon oxide layer 9 is done, for example an etching by plasma so as to clear the bottom of the wells 5 and 6. The selective etching causes the oxide located at the bottom of the wells to be removed without touching the oxide layer of the walls. This is shown in FIG. 7 shows.

In the next step, a conductive layer is deposited at the bottom of the wells 5 and 6, which may be done by the following procedure. A metal layer, for example a layer of nickel (or chromium or tantalum) with a thickness of 0.1 μm is deposited by cathode sputtering. Through an annealing operation, a nickel silicide is formed at the silicon/nickel interface, i.e. at the bottom of the wells 5 and 6. The thickness of the nickel silicide thus formed depends on the temperature and duration of the annealing operation. Silicide cannot be formed at the interface between the silicon oxide and the nickel. Then the nickel is etched chemically. This makes it possible to obtain a conductive layer 10 of nickel silicide at the bottom of the wells. This is shown in FIG. 8, where the layer 10 forms a supporting layer for the magnetic material which will fill the wells 5 and 6. By electrolysis, it is possible thus to deposit, for example, an iron-nickel alloy through a liquid phase that contains ions of these metals, the silicon substrate serving to provide for the electrical connection with the supporting layer 10. The silicide layer enables better adhesion of the pole pieces than would be in the case of pure silicon. FIG. 9 illustrates this stage of the method where the pole pieces are shown as the references 11 and 12.

It is then enough to carry out an etching of the silicon oxide projections to obtain the structure shown in FIG. 10.

The method according to the present invention is particularly well suited for magnetic heads for computer applications where small track widths are necessary. Indeed, for this type of head, the demagnetizing fields become very strong and then, during the preparation of the head, the procedure becomes greatly dependent on the shape anisotropy of this head. It is valuable, in this case, to be able to make a thicker pole piece and to design the gap accordingly.

The method according to the invention is also particularly well suited for heads for magnetic tape applications requiring a pole piece that is very thick (about 5 to 30 μm).

What is claimed is:

1. A method of manufacturing the pole pieces and the gap of magnetic heads in thin layers, starting from a silicon substrate, said method comprising the following steps:
   a) forming an insulating layer on a silicon substrate;
   b) depositing a metal layer on the insulating layer;
   c) depositing a masking resin layer on the metal layer;
   d) etching the substrate covered with the insulating layer and the metal layer to form wells bordering a bar of a determined width;
   e) removing the left-over portion of the metal layer etched in the previous step;
   f) thermo-oxidizing the etched substrate to develop a silicon oxide layer enabling the bar to be adjusted to obtain the desired gap;
   g) selectively etching the oxide layer developed in the previous step in order to remove the parts of this layer that are located at the bottom of the wells;
   h) depositing a conductive layer at the bottom of the wells;
   i) electrolytically depositing a magnetic material in the wells; and
   j) removing the left-over portion of the insulating layer initially deposited on the substrate.

2. A method according to claim 1 comprising the following additional steps between steps e) and f);
   a) forming by thermal oxidation a layer of silicon oxide with a determined thickness for restricting the width of the bar to the remaining silicon;
   b) removing the previously formed silicon oxide layer.

* * * * *